United States Patent
Zhong et al.

(10) Patent No.: US 7,920,148 B2
(45) Date of Patent: Apr. 5, 2011

(54) POST-RENDERING ANTI-ALIASING WITH A SMOOTHING FILTER

(75) Inventors: Lefan Zhong, San Jose, CA (US); Mike M. Kai, Newark, CA (US)

(73) Assignee: Vivante Corporation, Sunnyvale, CA (US)

( * ) Notice: Subject to any disclaimer, the term of this patent is extended or adjusted under 35 U.S.C. 154(b) by 899 days.

(21) Appl. No.: 11/786,223

(22) Filed: Apr. 10, 2007

(65) Prior Publication Data

US 2008/0252659 A1  Oct. 16, 2008

(51) Int. Cl.
G09G 5/00 (2006.01)
(52) U.S. Cl. .................................. 345/611; 345/422
(58) Field of Classification Search .............. 345/611, 345/613, 422
See application file for complete search history.

(56) References Cited

U.S. PATENT DOCUMENTS

| | | | | |
|---|---|---|---|---|
| 5,838,334 A * | 11/1998 | Dye | | 345/503 |
| 5,966,134 A * | 10/1999 | Arias | | 345/589 |
| 6,097,400 A * | 8/2000 | Dilliplane et al. | | 345/443 |
| 6,108,014 A * | 8/2000 | Dye | | 345/544 |
| 6,903,741 B2 * | 6/2005 | Corbetta | | 345/426 |
| 6,919,906 B2 * | 7/2005 | Hoppe et al. | | 345/611 |
| 6,990,681 B2 * | 1/2006 | Wang et al. | | 725/105 |
| 7,095,421 B2 * | 8/2006 | Vijayakumar et al. | | 345/613 |
| 7,286,138 B2 * | 10/2007 | Hoppe et al. | | 345/611 |
| 7,612,784 B2 * | 11/2009 | Oka | | 345/615 |
| 2006/0274064 A1 * | 12/2006 | Dougherty et al. | | 345/422 |
| 2007/0024614 A1 * | 2/2007 | Tam et al. | | 345/419 |

* cited by examiner

*Primary Examiner* — M Good Johnson
(74) *Attorney, Agent, or Firm* — Stevens Law Group; David R. Stevens

(57) ABSTRACT

A system to apply a smoothing filter during anti-aliasing at a post-rendering stage. An embodiment of the system includes a three-dimensional renderer, an edge detector, and a smoothing filter. The three-dimensional renderer is configured to render a three-dimensional scene. The edge detector is coupled to the three-dimensional renderer. The edge detector is configured to read values of a depth buffer and to apply edge detection criteria to the values of the depth buffer in order to detect an object edge within the three-dimensional scene. The smoothing filter coupled to the edge detector. The smoothing filter is configured to read values of a color buffer and to apply a smoothing coefficient to the values of the color buffer. The values of the color buffer include a pixel sample at the detected object edge.

6 Claims, 5 Drawing Sheets

POST-RENDERING ANTI-ALIASING WITH A SMOOTHING FILTER

BACKGROUND

Aliasing refers to the distortions that occur when a computer graphic is rendered at a resolution other than the original resolution. Anti-aliasing refers to the techniques used to minimize the effects, or distortions, of aliasing. Anti-aliasing is a common technique to improve image quality for graphics and other image based applications. There are many conventional methods to address image quality and the cost of anti-aliasing. Three of these conventional methods for full scene anti-aliasing in computer graphics applications are: accumulation buffer (A-buffer) anti-aliasing, supersample anti-aliasing, and multisample anti-aliasing (MSAA). A-buffer anti-aliasing uses an algorithm for polygon edge anti-aliasing. Since A-buffer anti-aliasing is not a complete solution to the aliasing problem, it is not widely used.

Supersample and multisample anti-aliasing are used for complete full scene anti-aliasing. In computer graphics, full scene anti-aliasing deals with the aliasing issues at the edge of an object and at the intersection of interpenetrating objects. Supersample anti-aliasing is implemented by rendering a scene at a higher resolution and then down-converting to a lower resolution output. In order to render the scene at a higher resolution, subsamples are used by taking more samples than would ordinarily be used for a single pixel. Mulitsample anti-aliasing is similar to supersample anti-aliasing, except that it is achieved at least partially through hardware optimization. In general, multisample anti-aliasing is less computationally complex than supersample anti-aliasing at the same performance and quality levels because of these hardware optimizations. Therefore, multisample anti-aliasing is typically implemented, instead of supersample anti-aliasing, in most modem computer graphics systems.

For supersample and multisample anti-aliasing, the quality of the image is highly dependent on the number of samples or subsamples used. Using a larger number of samples or subsamples gives a higher quality image. However, using a larger number of samples or subsamples consumes more memory resources for storing the samples. Additionally, using a larger number of samples or subsamples consumes significant computational resources such as the central processing unit (CPU) or graphics processing unit (GPU).

SUMMARY

Embodiments of a system are described. In one embodiment, the system is configured to apply a smoothing filter during anti-aliasing at a post-rendering stage. An embodiment of the system includes a three-dimensional renderer, an edge detector, and a smoothing filter. The three-dimensional renderer is configured to render a three-dimensional scene. The edge detector is coupled to the three-dimensional renderer. The edge detector is configured to read values of a depth buffer and to apply edge detection criteria to the values of the depth buffer in order to detect an object edge within the three-dimensional scene. The smoothing filter coupled to the edge detector. The smoothing filter is configured to read values of a color buffer and to apply a smoothing coefficient to the values of the color buffer. The values of the color buffer include a pixel sample at the detected object edge. Other embodiments of the system are also described.

Embodiments of a method are also described. In one embodiment, the method is a method for applying anti-aliasing. An embodiment of the method includes rendering a three-dimensional scene, applying edge detection criteria based on values of a depth buffer to the rendered three-dimensional scene to detect an object edge, and applying a smoothing coefficient to values of a color buffer for a pixel sample at the detected object edge. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
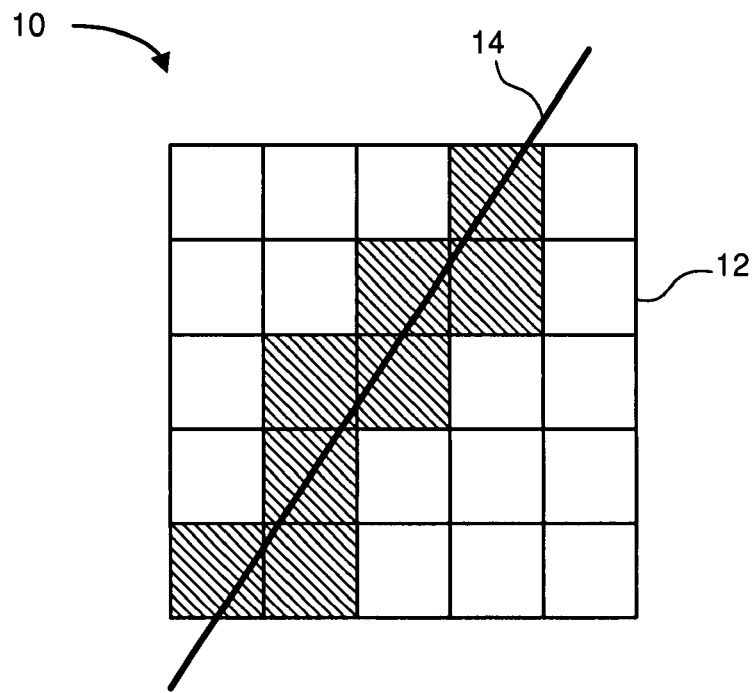
FIG. 1 depicts a schematic diagram of one embodiment of a line rendering using a plurality of pixels to render a line.

FIG. 1 depicts a schematic diagram of one embodiment of a line rendering 10 using a plurality of pixels 12 to render a line 14. Each pixel is represented by a square, and the pixels 12 which correspond to the line 14 are shown hatched to indicate that the designated pixels 12 would be colored (e.g., different from a background color) to represent the line 14. Since the pixels 12 are square, the line rendering 10 represents the line 14 using a group of square pixels 12 arranged approximately along the path of the line 14. Depending on the thickness and orientation of the line 14, the pixels 12 may or may not be able to smoothly represent the line 14 in the pixel rendering 10.

Figure 2:
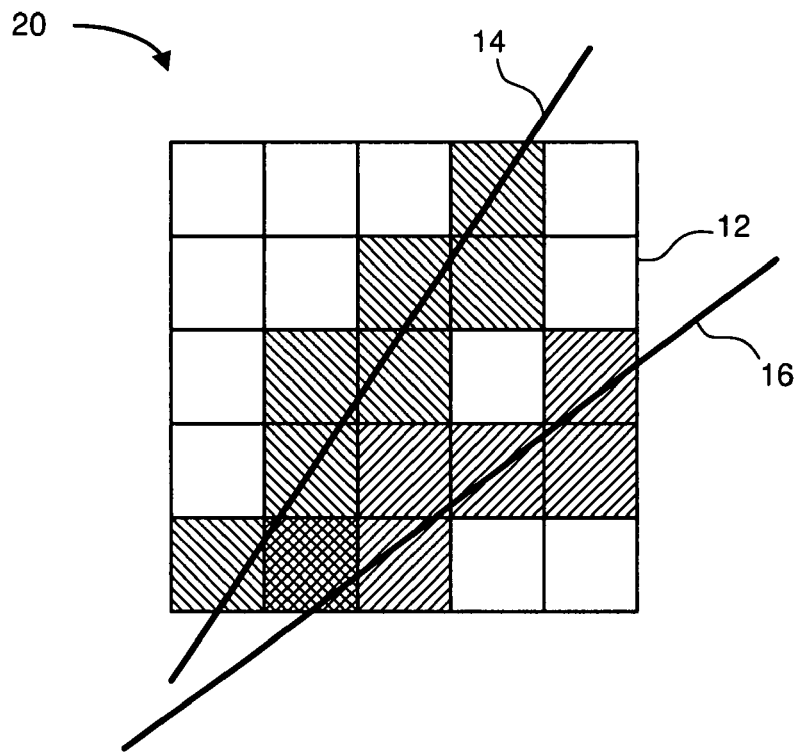
FIG. 2 depicts a schematic diagram of another embodiment of a line rendering using a plurality of pixels to render two lines.

FIG. 2 depicts a schematic diagram of another embodiment of a line rendering 20 using a plurality of pixels 12 to render two lines 14 and 16. The first line 14 is the same as the line 14 shown in FIG. 1. The second line 16 is shown using a distinct hatching pattern. In some embodiments, the distinct hatching pattern could designate a distinct color from the color used to render the first line 14. For example, the first line 14 may be rendered with blue pixels 12, and the second line 16 may be rendered with red pixels 12. Where a pixel 12 is used to render both the first line 14 and the second line 16, the pixel 12 is shown cross-hatched. In this case, the cross-hatched pixel 12 may be rendered with a blue pixel 12, a red pixel 12, or some combination of blue and red (e.g., purple).

Because of the aliasing of the line rendering 20, some representations may appear to have distortions. For example, the line rendering 20 may appear to render the first line 14 and the second line 16 in a manner that gives the appearance that the lines 14 and 16 intersect near the cross-hatched pixel 12, separate moving up and to the right, and then intersect again where the corners of the differently hatched pixels 12 touch.

In other words, the unhatched pixel 12 between the lines might appear to be a hole in the intersecting lines. This distortion is an effect of aliasing.

It should be noted that full scene anti-aliasing, in computer graphics, deals with the aliasing issues at the edges of objects as well as at the intersection of interpenetrating objects. The aliasing issues within an object (i.e., not at the edges) are typically resolved by using a texture re-sampling filter. Alternatively, or in addition to texture re-sampling, smooth shading (e.g., Garoud and Phong shading) may be used to resolve aliasing issues within an object. By applying different anti-aliasing filters to the object edges and intersecting areas, compared to the areas within an object, a smaller number of samples can be used to achieve a similar or better effect than using a higher number of samples with conventional anti-aliasing techniques.

Figure 3:
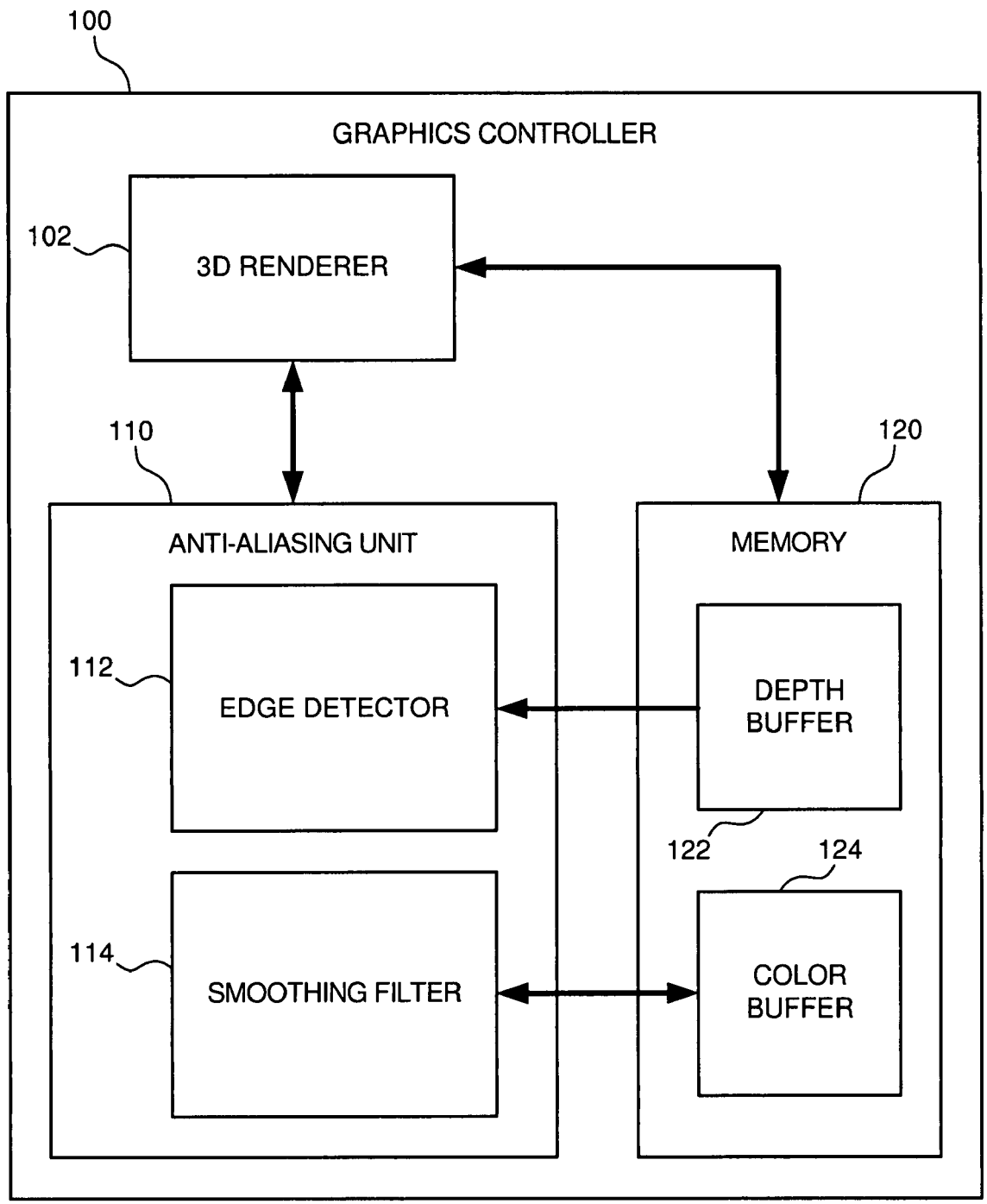
FIG. 3 depicts a schematic block diagram of one embodiment of a graphics controller.

FIG. 3 depicts a schematic block diagram of one embodiment of a graphics controller 100 having components coupled or otherwise communicating with other components. As used herein, coupled components or entities are intended to broadly include components that are physically connected, and also includes entities that are not physically connected but that are able to communicate or otherwise transmit a signal or information by various means. The illustrated graphics controller 100 includes a three-dimensional (3D) renderer 102, an anti-aliasing unit 110, and a memory 120. The anti-aliasing unit 110 includes an edge detector 112 and a smoothing filter 114. The memory 120 includes a depth buffer 122 (also referred to as a z-buffer) and a color buffer 124. Although the graphics controller 100 is shown and described with certain component and functions, other embodiments of the graphics controller 100 may include fewer or more components and may be configured to implement more or less functionality than is described herein.

In one embodiment, the 3D renderer 102 renders, or generates, an image from a model which describes one or more 3D objects. Conventional rendering techniques are well-known in the art; hence, a more detailed description of 3D rendering is not provided herein. In one embodiment, the 3D renderer 102 stores at least some of the image information in the memory 120. In particular, the 3D renderer 102 may store depth data in the depth buffer 122 and color data in the color buffer 124. The color data includes, for example, red, blue, and green (RGB) and alpha components.

After the 3D renderer 102 renders an image, the image may be processed by the anti-aliasing unit 110 to remove aliasing distortions. In one embodiment, the anti-aliasing unit 110 implements a technique to detect edges and intersections of objects. In particular, the edge detector 112 reads the depth information from the depth buffer in order to detect the edge of an object or the intersection of multiple objects. In one embodiment, conventional edge detection techniques may be used to detect the object edges and intersections. Alternatively, the following edge detection criteria may be used to detect object edges and intersections:

$$|z2 + z0 - 2 \times z1| \geq \text{Thresh} \times (Q - z1), \text{ and}$$

$$Q = \frac{z_{far}}{z_{far} - z_{near}}, \text{ where}$$

z1 designates a depth value of a current sample or subsample, z0 and z2 designate depth values of adjacent samples or subsamples, Thresh designates a predefined threshold value, and Q is a depth coefficient. In some embodiments, the value $|z2+z0-2\times z1|$ may be referred to as a depth indicator. Furthermore, other embodiments may implement different edge detection techniques. For example, another embodiment may use the following edge detection criteria:

$$|z2+z0-2\times z1|>\text{Thresh}$$

which is a variation of the edge detection criteria described above, without the depth coefficient.

For the samples or subsamples approximately at a detected edge or intersection, the smoothing filter 114 applies a smoothing coefficient in order to achieve a high quality image. In particular, the smoothing filter 114 reads the color data from the color buffer 124 and applies a smoothing coefficient to the color data. In one embodiment, conventional smoothing techniques may be used to smooth the samples or subsamples at the detected edge or intersection. Alternatively, other smoothing techniques may be implemented, as described below.

Figure 4:
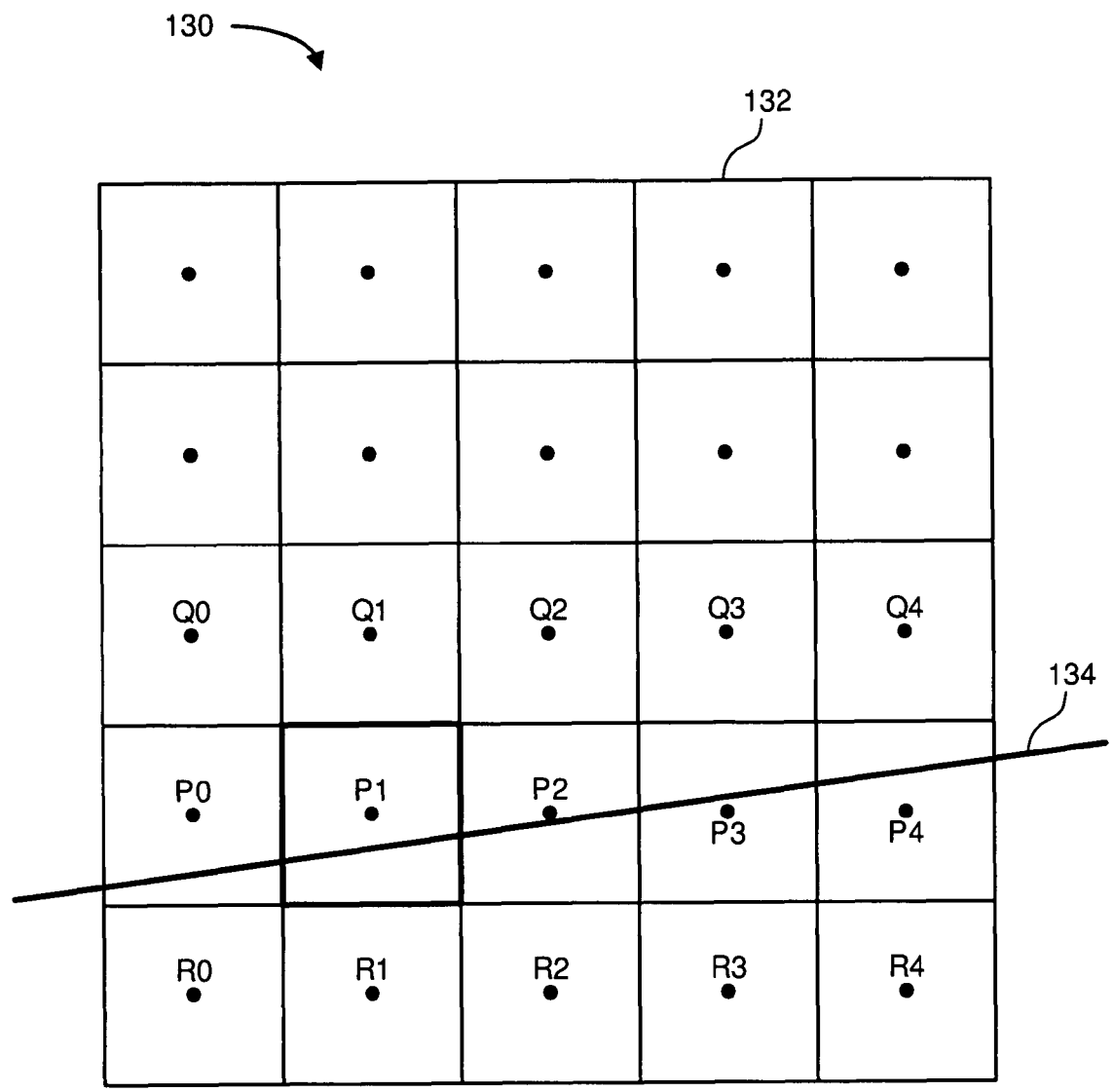
FIG. 4 depicts a schematic diagram of one embodiment of a pixel grouping that is used to apply a smoothing filter at a post-rendering stage.

FIG. 4 depicts a schematic diagram of one embodiment of a pixel grouping 130 that is used to apply a smoothing filter 114 at a post-rendering stage. The pixel grouping 130 illustrates a single sample (shown as dots) at each of the pixels 132. For convenience, the pixels 132 are referred to herein by the same designation as the corresponding sample. For example, the pixel 132 corresponding to sample P1 is referred to as pixel P1. A detected edge 134 is also shown (indicated by a line). In another embodiment, the line could represent a detected intersection between two or more objects.

For each pixel 132 along the detected edge 134, the smoothing filter 114 applies a smoothing coefficient to mitigate the effects of aliasing. In one embodiment, the smoothing filter 114 applies the following smoothing coefficient for the current pixel 132 corresponding to the sample P1:

$$P1' = \begin{pmatrix} Q0 & Q1 & Q2 \\ P0 & P1 & P2 \\ R0 & R1 & R2 \end{pmatrix} \times \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}$$

This equation can also be written as:

$$P1' = \frac{Q0 + 2\times Q1 + 2\times P0 + 4\times P1 + 2\times P2 + R0 + 2\times R1 + R2}{16}$$

The smoothing filter 114 then writes P1' (the new value for P1) back to the color buffer 124. In one embodiment, the smoothing filter 114 reads and writes blocks of data in the color buffer 124, rather than single values. In this scenario, the smoothing filter 114 may write all nine values for the current sample, P1, and adjacent samples, but only the value of the current sample is modified. Furthermore, as new blocks of color data are read from the color buffer 124 by the smoothing filter 114, the smoothing filter 114 may use the original color data, rather than the modified color data, to calculate subsequent pixel values.

As an example, the smoothing filter 114 reads P0-P2, Q0-Q2, and R0-R2 from the color buffer 124 and then calculates P1' as described above. Then the smoothing filter 114 writes P1', as well as the original values for P0, P2, Q0-Q2, and R0-R2, back to the color buffer 124. In one embodiment, the smoothing filter 114 writes these values to a new location in the color buffer 124 so that the original values are not altered. Next, the smoothing filter 114 reads P1-P3, Q1-Q3, and R1-R3 from the color buffer 124 and then calculates P2' using a similar smoothing function to the function described above for P1'. The smoothing filter 114 then writes P2', as well as the original values for P1, P3, Q1-Q3, and R1-R3, back to a new location in the color buffer 124. Next, the smoothing filter 114 reads P2-P4, Q2-Q4, and R2-R4 from the color buffer 124 and then calculates P3' using a similar smoothing function to the function described above for P1'. The smoothing filter 114 then writes P3', as well as the original values for P2, P4, Q2-Q4, and R2-R4, back to a new location in the color buffer 124. This procedure continues for all of the samples along the detected edge 134 or intersection. After all of the new sample values have been calculated, the original values in the color buffer 124 may be overwritten with the new values.

Figure 5:
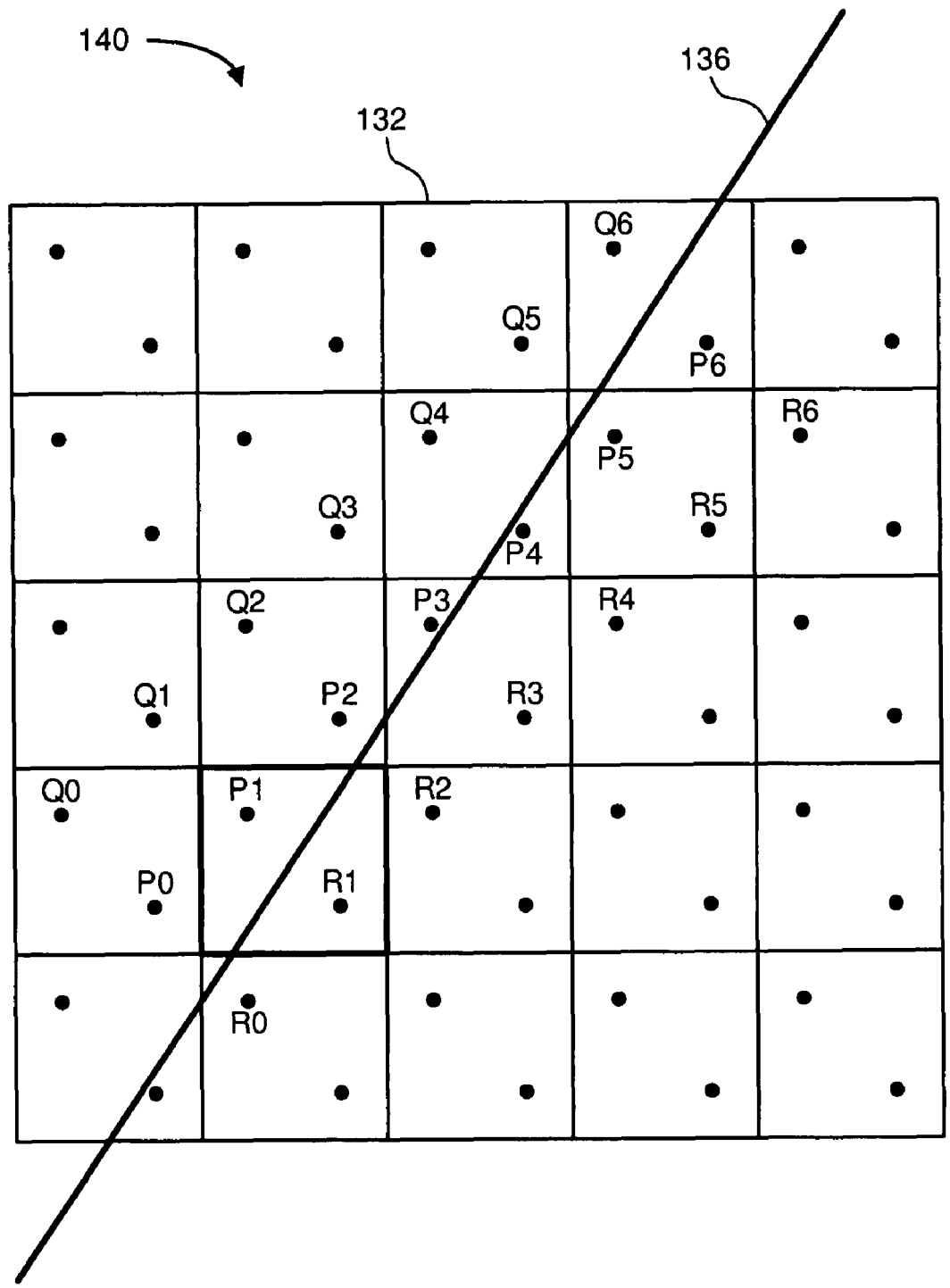
FIG. 5 depicts a schematic diagram of another embodiment of a pixel grouping that is used to apply a smoothing filter at a post-rendering stage.

FIG. 5 depicts a schematic diagram of another embodiment of a pixel grouping 140 that is used to apply a smoothing filter 114 at a post-rendering stage. The pixel grouping 140 illustrates two subsamples (shown as dots) at each of the pixels 132. Since the pixel grouping 140 uses multiple subsamples for each pixel 132, the pixels 132 are designated herein by the corresponding subsamples. For example, the pixel 132 corresponding to subsamples P1 and R1 is designated herein as pixel PR1. However, this designation is arbitrary and other embodiments may implement other nomenclatures. FIG. 5 also shows a detected edge 136 (indicated by a line). In another embodiment, the line could represent a detected intersection between two or more objects.

For each pixel 132 along the detected edge 136, the smoothing filter 114 applies a smoothing coefficient to mitigate the effects of aliasing. In one embodiment, the smoothing filter 114 applies the following smoothing coefficient for the current pixel, PR1, corresponding to the subsamples P1 and R1:

$$PR1' = \begin{pmatrix} P0 & P1 & P2 \\ R0 & R1 & R2 \end{pmatrix} \times \begin{pmatrix} \frac{1}{8} & \frac{2}{8} & \frac{1}{8} \\ \frac{1}{8} & \frac{2}{8} & \frac{1}{8} \end{pmatrix}$$

This equation can also be written as:

$$PR1' = \frac{P0 + 2 \times P1 + P2 + R0 + 2 \times R1 + R2}{8}$$

The smoothing filter 114 then writes the new value for pixel PR1 back to the color buffer 124. In one embodiment, the smoothing filter 114 may write values for multiple pixels, but only the value of the current pixel is modified. Furthermore, as new blocks of color data are read from the color buffer 124 by the smoothing filter 114, the smoothing filter 114 may use the original color data, rather than the modified color data, to calculate subsequent pixel values.

As an example, the smoothing filter 114 reads P0-P2 and R0-R2 from the color buffer 124 and then calculates PR1' as described above. Then the smoothing filter 114 writes PR1' back to the color buffer 124. Next, the smoothing filter 114 reads P1-P3 and Q1-Q3 from the color buffer 124 and then calculates QP2' using a similar smoothing function to the function described above for PR1'. The smoothing filter 114 then writes QP2' back to a new location in the color buffer 124. Next, the smoothing filter 114 reads P2-P4 and R2-R4 from the color buffer 124 and then calculates PR3' using a similar smoothing function to the function described above for PR1'. The smoothing filter 114 then writes PR3' back to a new location in the color buffer 124. This procedure continues for all of the pixels 132 along the detected edge 136 or intersection. After all of the new pixel values have been calculated, the original values in the color buffer 124 may be overwritten with the new values.

In one embodiment, the type of smoothing filter coefficient applied depends on the type of sampling that is used. Although examples are provided above to show possible smoothing filter coefficients for supersampling and 2× multisampling, other smoothing filter coefficients may be used for other sampling variations.

Figure 6:
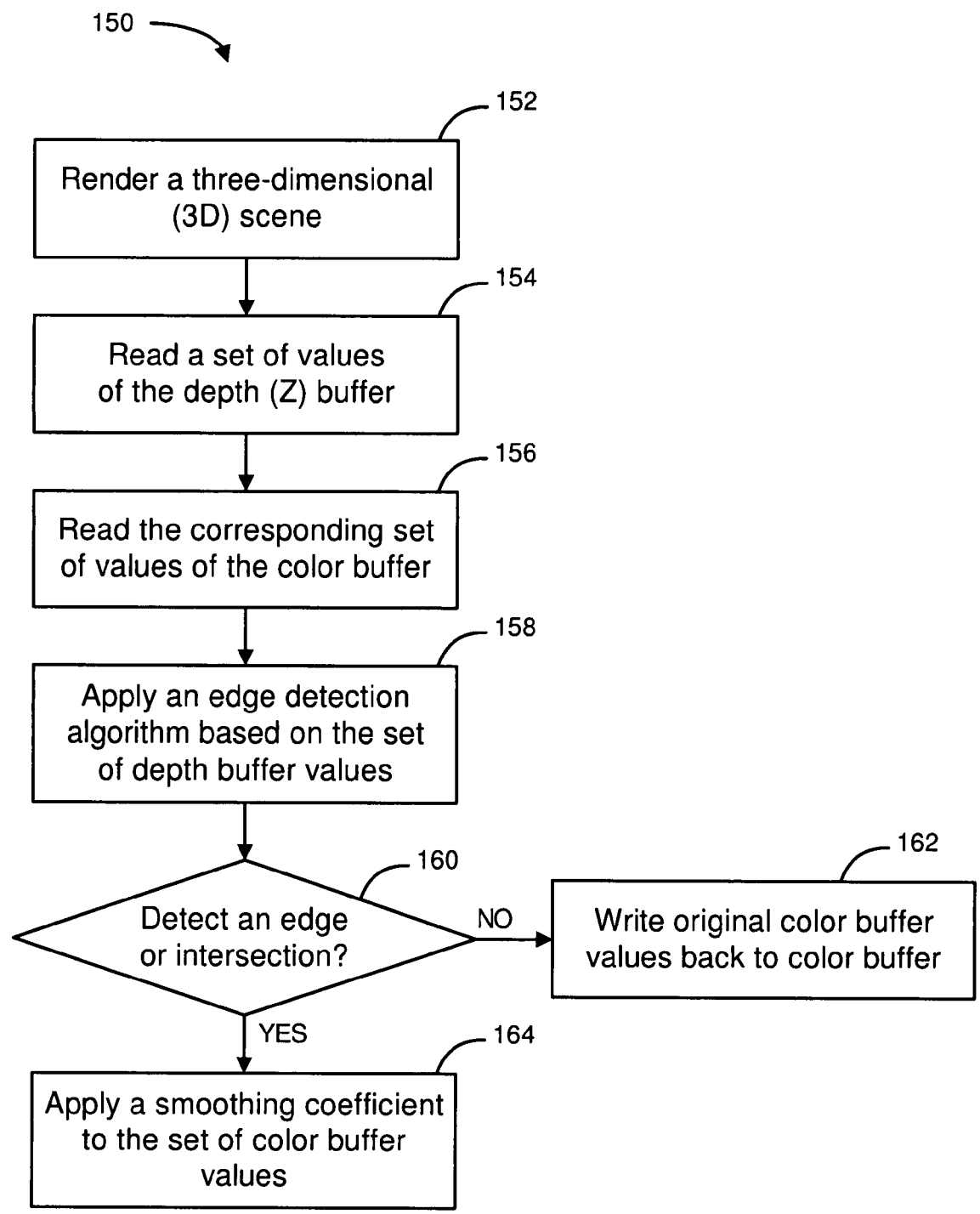
FIG. 6 depicts a schematic flowchart diagram of one embodiment of a method for rendering an image.

FIG. 6 depicts a schematic flowchart diagram of one embodiment of a method 150 for rendering an image. Some embodiments of the method 150 may be implemented in conjunction with the graphics controller 100 and the anti-aliasing unit 110 described above. While an embodiment of the method 150 is described with reference to the graphics controller 100 and the anti-aliasing unit 110, other embodiments may be implemented in conjunction with other computer graphics systems.

The illustrated method 150 begins as the 3D renderer 102 renders 152 a 3D scene. As described above, rendering a 3D scene may include executing graphical commands to render one or more graphical objects. The anti-aliasing unit 110 then reads 154 a set of depth values from the depth buffer 122. The anti-aliasing unit 110 also reads 156 a corresponding set of color values from the color buffer 124. Using the depth values, the edge detector 112 applies 158 an edge detection algorithm to determine 160 if there is an object edge or intersection. If the edge detector 112 does not detect an object edge or intersection, then the corresponding color data is written 162 back to the color buffer 124 unchanged. In one embodiment, any corresponding data that might be read by the smoothing filter 114 is simply written back out unchanged. Otherwise, if the edge detector 112 detects an edge or intersection, then the smoothing filter 114 applies 164 a smoothing coefficient to the corresponding color values. As described above, the smoothing filter 114 may apply different types of smoothing coefficients depending on the type of edge or intersection that is detected, and so forth. The depicted method 150 then ends.

Embodiments of the system and method described herein facilitate improved anti-aliasing compared to conventional anti-aliasing techniques. Additionally, some embodiments may be used in conjunction with one or more conventional anti-aliasing techniques. For example, one embodiment may be used as an improvement of conventional multisample anti-aliasing.

Furthermore, some embodiments provide a relatively high image quality for a small number of samples. In this way, the image quality may be comparable to an image rendered using a conventional anti-aliasing technique and a higher number of samples. For example, an embodiment using 1 sample per pixel may achieve an image quality that is better than an image processed using 2-sample MSAA. Similarly, an embodiment using 2 samples per pixel may achieve an image quality that is about the same as an image processed using 4-sample MSAA. Furthermore, an embodiment using 4 samples per pixel may achieve an image quality that is about the same as an image processed using 6-sample MSAA. Hence, various embodiments may be implemented to provide a high quality image at a relatively low complexity and cost.

Embodiments of the invention also may involve a number of functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A system to apply a smoothing filter during anti-aliasing at a post-rendering stage, the system comprising:
a three-dimensional renderer to render a three-dimensional scene,
an edge detector configured to communicate with the three-dimensional renderer, the edge detector to read values of a depth buffer and to apply edge detection criteria to the values of the depth buffer in order to detect an object edge within the three-dimensional scene; and
a smoothing filter configured to communicate with the edge detector, the smoothing filter to read values of a color buffer and the apply a smoothing coefficient to the values of the color buffer, wherein the values of the color buffer comprise a pixel sample at the detected object edge;
wherein the edge detection criteria comprises:

$$|z2+z0-2 \times z1| \geq \text{Thresh} \times (Q-z1)$$

where the variable z1 designates a depth value of a current pixel sample, the variables z0 and z2 designate depth values of adjacent pixel samples, the variable Thresh designates a predefined threshold value, and the variable Q designates a depth coefficient given by:

$$Q = \frac{z_{far}}{z_{far} - z_{near}}.$$

2. The system of claim 1, wherein the filter coefficient comprises:

$$\begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}$$

wherein components ($2/16$, $4/16$, $2/16$) are for multiplication with pixel samples along the detected object edge, centered at a current pixel sample, and components ($1/16$, $2/16$, $1/16$) are for multiplication with adjacent sets of pixel samples approximately parallel with the detected object edge.

3. The system of claim 1, wherein the filter coefficient comprises:

$$\begin{pmatrix} \frac{1}{8} & \frac{2}{8} & \frac{1}{8} \\ \frac{1}{8} & \frac{2}{8} & \frac{1}{8} \end{pmatrix}$$

wherein components ($2/8$) and ($2/8$) are for multiplication with pixel subsamples within a current pixel along the detected object edge, and components ($1/8$, $1/8$, $1/8$, $1/8$) are for multiplication with pixel subsamples of adjacent pixels approximately parallel with the detected object edge.

4. A method for applying anti-aliasing, the method comprising:
rendering a three-dimensional scene;
applying edge detection criteria to the rendered three-dimensional scene to detect an object edge, wherein the edge detection criteria is based on values of a depth buffer; and
applying a smoothing coefficient to values of a color buffer for a pixel sample at the detected object edge;
wherein applying the edge detection criteria comprises comparing a computed depth indicator and a value dependent on a threshold;
wherein the edge detection criteria comprises:

$$|z2+z0-2 \times z1| > \text{Thresh} \times (Q-z1)$$

where the variable z1 designates a depth value of a current pixel sample, the variables z0 and z2 designate depth values of adjacent pixel samples, the variable Thresh designates a predefined threshold value, and the variable Q designates a depth coefficient given by:

$$Q = \frac{z_{far}}{z_{far} - z_{near}}.$$

wherein applying the smoothing coefficient comprises multiplying a plurality of pixel samples by the filter coefficient.

5. A method for applying anti-aliasing, the method comprising:
rendering a three-dimensional scene;
applying edge detection criteria to the rendered three-dimensional scene to detect an object edge, wherein the edge detection criteria is based on values of a depth buffer; and
applying a smoothing coefficient to values of a color buffer for a pixel sample at the detected object edge;
wherein applying the smoothing coefficient comprises multiplying a plurality of pixel samples by the filter coefficient;
wherein the filter coefficient comprises:

$$\begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}$$

wherein components (2/16, 4/16, 2/16) are for multiplication with pixel samples along the detected object edge, centered at a current pixel sample, and components (1/16, 2/16, 1/16) are for multiplication with adjacent sets of pixel samples approximately parallel with the detected object edge.

6. A computer readable storage medium embodying a program of machine-readable instructions, executable by a digital processor, to perform operations to facilitate anti-aliasing at a post-rendering stage, the operations comprising:
access data stored to represent the rendered three-dimensional scene;
apply edge detection criteria to the rendered three-dimensional scene to detect an object edge, wherein the edge detection criteria is based on values of a depth buffer; and
apply a smoothing coefficient to values of a color buffer for a pixel sample at the detected object edge;
the operations further comprising an operation to compare a computed depth indicator and a value dependent on a threshold, wherein the depth indicator comprises:

$$|z2+z0-2 \times z1|$$

where the variable z1 designates a depth value of a current pixel sample, and the variables z0 and z2 designate depth values of adjacent pixel samples, and wherein the value dependent on the threshold comprises:

$$\text{Thresh} \times (Q-z1)$$

where the variable Thresh designates a predefined threshold value, and the variable Q designates a depth coefficient given by:

$$Q = \frac{z_{far}}{z_{far} - z_{near}}.$$

* * * * *